(12) United States Patent
Nakatukasa

(10) Patent No.: US 6,528,965 B2
(45) Date of Patent: Mar. 4, 2003

(54) DRIVE CIRCUIT OF BRUSHLESS MOTOR

(75) Inventor: Hirotaka Nakatukasa, Tokyo (JP)

(73) Assignee: TGK Co., Ltd., Hachioji (JP)

( * ) Notice: Subject to any disclaimer, the term of this patent is extended or adjusted under 35 U.S.C. 154(b) by 42 days.

(21) Appl. No.: 09/920,464

(22) Filed: Aug. 1, 2001

(65) Prior Publication Data
US 2002/0021104 A1 Feb. 21, 2002

(30) Foreign Application Priority Data

Aug. 11, 2000 (JP) ........................................ 2000-244114

(51) Int. Cl.[7] ................................................. H02P 1/24
(52) U.S. Cl. ........................ 318/727; 318/254; 318/431
(58) Field of Search ................................ 318/254, 138, 318/439, 430, 431, 432, 433, 434, 727; 361/33

(56) References Cited

U.S. PATENT DOCUMENTS 5,376,866 A * 12/1994 Erdman ....................... 318/254

* cited by examiner

*Primary Examiner*—Karen Masih
(74) *Attorney, Agent, or Firm*—Patterson, Thuente, Skaar & Christensen LLC

(57) ABSTRACT

A drive circuit of a brushless motor including a search coil L1 and a drive coil L2 is comprised of a Schmitt trigger circuit formed by a first operational amplifier OP1 which detects rotation of the motor by the search coil L1, and an oscillator circuit formed by a second operational amplifier OP2 which functions as an inverter during rotation of the motor and functions as a rotation stoppage signal-delivering section during stoppage of the motor, whereby the drive coil L2 is caused to be alternately driven by the first operational amplifier OP1 and the second operational amplifier OP2. This makes it possible to realize the drive circuit of the brushless motor by a simple construction using two operational amplifiers, and detect the stoppage of rotation of the motor, by causing the second operational amplifier to deliver a oscillating signal to the outside, when the rotation of the rotor is stopped.

4 Claims, 5 Drawing Sheets

DRIVE CIRCUIT OF BRUSHLESS MOTOR

BACKGROUND OF THE INVENTION

(1) Field of the Invention

This invention relates to a drive circuit of a brushless motor, and more particularly to a drive circuit of a brushless motor which is used as a fan motor of an air-conditioning unit for an automotive vehicle, for sampling a compartment temperature by sucking air at a predetermined location within a compartment of the vehicle.

(2) Description of the Related Art

Conventionally, among air-conditioning units for automotive vehicles, there is a type which samples air temperature at a predetermined location within a compartment of the vehicle and carries out temperature adjustment such that the temperature within the compartment becomes equal to a preset temperature. As a device for detecting the air temperature, an in-car sensor is known. The in-car sensor is comprised of a thermistor and an aspirator, and the aspirator is comprised of a fan for sucking air within the compartment and guiding the air to the thermistor, and a motor for driving the fan. The motor used for the aspirator is required to be quiet since a port of the aspirator for sucking air is arranged at a location near the head of an occupant, and therefore, a brushless motor is used therefor. An example of a circuit for driving such a brushless motor will be shown below.

FIG. 4 is a circuit diagram showing an example of a drive circuit of a conventional brushless motor.

This drive circuit of the brushless motor is a drive circuit for a motor including two drive coils L11, L12, and is comprised of two transistors TR1, TR2, resistances R11, R12, and capacitors C11, C12 forming an astable multivibrator circuit, and an oscillator circuit.

The drive coils L11, L12 are connected to collectors of the transistors TR1, TR2, and the collectors of the transistors TR1, TR2 and the capacitors C11, C12 are connected in cross connection within the oscillator circuit 1. The oscillator circuit 1 monitors a back electromotive force (braking torque) developed in the drive coils L11, L12 in response to the transistors R1, R2 and the capacitors C11, C12, and starts oscillation at a predetermined frequency when stoppage of the motor is detected, to supply its oscillating output to an external output terminal SG-OUT via a resistance R13.

When the power supply ±V is applied to the transistors TR1, TR2, the transistors TR1, TR2 repeatedly carry out on/off operation at an oscillation frequency determined by a time constant of the resistances R11, R12 and the capacitors C11, C12, whereby electricity flows through the drive coils L11, L12 which are wound in respective opposite directions in an alternating manner. This makes it possible to continuously rotate the motor in a certain direction. During normal rotation, the oscillation is carried out at a shorter repetition period than a repetition period of a oscillation frequency determined by a time constant of the resistance R11 and the capacitor C11, for rotation of the motor.

When the back electromotive force of the drive coils L11, L12 of the motor is detected due to a locked state of the motor in which the rotation of the motor is stopped by some cause, the oscillator circuit 1 carries out self-oscillation at a predetermined frequency determined by the time constant of the resistance R11 and the capacitor C11, and delivers the oscillating output signal to an external circuit via the external output terminal SG-OUT thereof.

FIG. 5 is a circuit diagram showing another example of a drive circuit of a conventional brushless motor.

This drive circuit of the brushless motor is a drive circuit for a motor including a search coil L21 for detecting rotation thereof, and a drive coil L22 for driving the motor for rotation, and is comprised of transistors TR11 to TR13, resistances R21 to R23, a capacitor C21, and a diode D1.

The search coil L21 is connected between the bases of the transistors TR11, TR12 in current mirror circuit configuration, and detects a voltage induced by the motion of the magnet of the rotor. The transistor TR13 turns on when electric current is supplied via the resistances R22, R23 to its base to drive the drive coil L22, and turns off when the supply of electric current via the resistance R23 to its base is cut off by a turn-on operation of the transistor TR12 caused by the electromotive force detected by the search coil L21. Thus, the on/off operation of the drive coil L22 caused by the transistor TR13 generates a drive torque to thereby drive the motor for rotation.

However, although the type of the drive circuit of the conventional brushless motor having the unastable multivibrator circuit configuration is equipped with the oscillator circuit for notifying the stoppage state of the motor to the outside, it is complicated in circuit configuration and suffers from the problem that the oscillation frequency is not stable due to susceptibility to changes in temperature.

Further, although the type of the drive circuit of the brushless motor making use of the search coil is simple in circuit configuration and excellent temperature characteristics, it does not have the function of notifying the stoppage of the motor to the outside, and hence even when the motor is stopped during its operation of rotation, the stoppage of the rotation cannot be known from the outside.

SUMMARY OF THE INVENTION

The present invention has been made in view of the above points, and an object thereof is to provide a drive circuit for a brushless motor which is simple in construction and has a function of detecting the stoppage of rotation of the motor.

To accomplish the above objects, according to the present invention, there is provided a drive circuit of a brushless motor including a drive coil for driving a rotor portion of a magnet, and a search coil for detecting rotation of the rotor. The drive circuit of a brushless motor comprises a first operational amplifier that forms a Schmitt trigger circuit performing on/off operation based on a rotation detection signal generated by the search coil, and has an output thereof connected to one end of the drive coil and a second operational amplifier that forms an oscillator circuit performing inversion in synchronism with the on/off operation of said first operational amplifier, and oscillating at a predetermined frequency when said first operational amplifier does not perform the on/off operation, and has an output thereof connected to another end of the drive coil and at the same time to an output terminal to an external circuit.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Hereinafter, an embodiment of the present invention will now be described in detail with reference to drawings.

Figure 1:
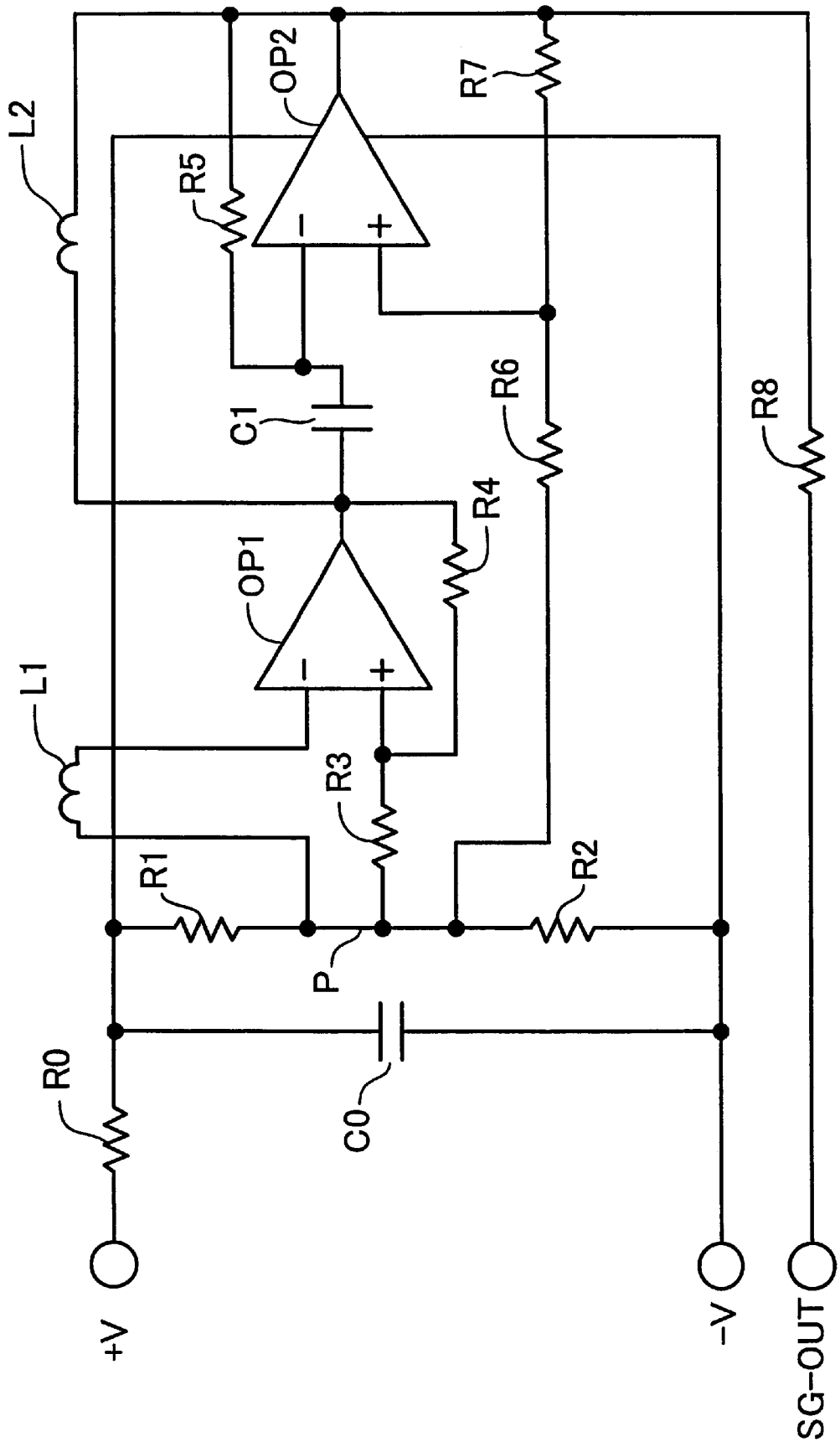
FIG. 1 is a circuit diagram showing a drive circuit of a brushless motor, according to the invention.

FIG. 1 is a circuit diagram showing a drive circuit of a brushless motor, according to the invention.

The drive circuit of the brushless motor, according to the invention, is comprised of a Schmitt trigger circuit formed by a first operational amplifier OP1 and an oscillator circuit formed by a second operational amplifier OP2. The first operational amplifier OP1 and the second operational amplifier OP2 are implemented by an integrated circuit having a dual configuration in which two operational amplifiers for high-current drive are incorporated in a single package. Further, a search coil L1 is arranged adjacent to a drive coil L2 wound around a yoke, and detects changes in magnetic flux caused by the rotational motion of the magnet driven for rotation by the drive coil L2 to thereby monitor the rotation of a rotor portion of the motor.

The drive circuit of the brushless motor has power supply terminals +V, −V thereof connected to a filter formed by a resistance RO and a capacitor CO. This filter absorbs surge voltage superposed on the power source line and high-frequency noise. The capacitor CO has opposite ends thereof connected to respective two resistances R1, R2 which are connected in series to each other. These resistances R1, R2 have the same resistance value, and a junction between them represents a neutral voltage point P. The neutral voltage point P provides a neutral voltage to this drive circuit of the brushless motor, for operating the first and second operational amplifiers OP1, OP2. The neutral voltage point P is connected via the search coil L1 to an inverting input of the first operational amplifier OP1 and via a resistance R3 to a non-inverting input of the first operational amplifier OP1. A resistance R4 is connected between the non-inverting input and an output of the first operational amplifier OP1. The output of the first operational amplifier OP1 is connected via the capacitor C1 to an inverting input of the second operational amplifier OP2, and a resistance R5 is connected between the inverting input and an output of the second operational amplifier OP2.

The second operational amplifier OP2 has a non-inverting input thereof connected via a resistance R6 to the neutral voltage point of the resistances R1, R2, and via a resistance R7 to the output of the second operational amplifier OP2. The drive coil L2 of the brushless motor is connected between the output of the first operational amplifier OP1 and the output of the second operational amplifier OP2. Then, the output of the second operational amplifier OP2 is connected via a resistance R8 to the external output terminal SG-OUT.

The non-inverting input of the first operational amplifier OP1 inputs a reference voltage for detecting a voltage induced by the search coil L1. The reference voltage can assume two values in dependence on the state of output from the first operational amplifier OP1, which forms a Schmitt trigger circuit having a hysteresis. More specifically, assuming that the neutral voltage point P at the junction of the resistances R1, R2 being 0, and the output of the first operational amplifier OP1 is outputting a high level voltage Voh, the reference voltage Uth is calculated by:

[Math. 1]

$$+Uth = Voh \times R3/(R3+R4) \qquad (1)$$

and, when the output of the first operational amplifier OP1 is outputting a low level voltage Vol, the reference voltage Uth is calculated by;

[Math. 2]

$$-Uth = Vol \times R3/(R3+R4) \qquad (2)$$

That is, the first operational amplifier OP1 forms a Schmitt trigger circuit which has its output inverted when the voltage of the search coil L1 is equal to ±Uth.

The second operational amplifier OP2 outputs an output signal having a predetermined frequency when the rotation of the motor is stopped, and forma a CR oscillator circuit together with the capacitor C1 and a resistance R5. The predetermined oscillation frequency is determined by a time constant of the capacitor C1 and the resistance R5, and a resistance ratio of the resistances R6 and R7, and set to a value sufficiently lower than a frequency at which the drive coil L2 is driven during normal rotation of the motor. That is, the oscillation frequency of the second operational amplifier OP2 is set to such a frequency that the repetition period of the oscillation frequency of the second operational amplifier OP2 is longer than a time period required for the magnet rotor to perform rotation through an amount corresponding to one pole by switching of magnetic poles, thereby ensuring that the motor can be positively started after it is recovered from its rotation-inhibited state.

Next, the operation of the drive circuit of the brushless motor will be described while showing waveforms at essential parts of the drive circuit.

Figure 2:
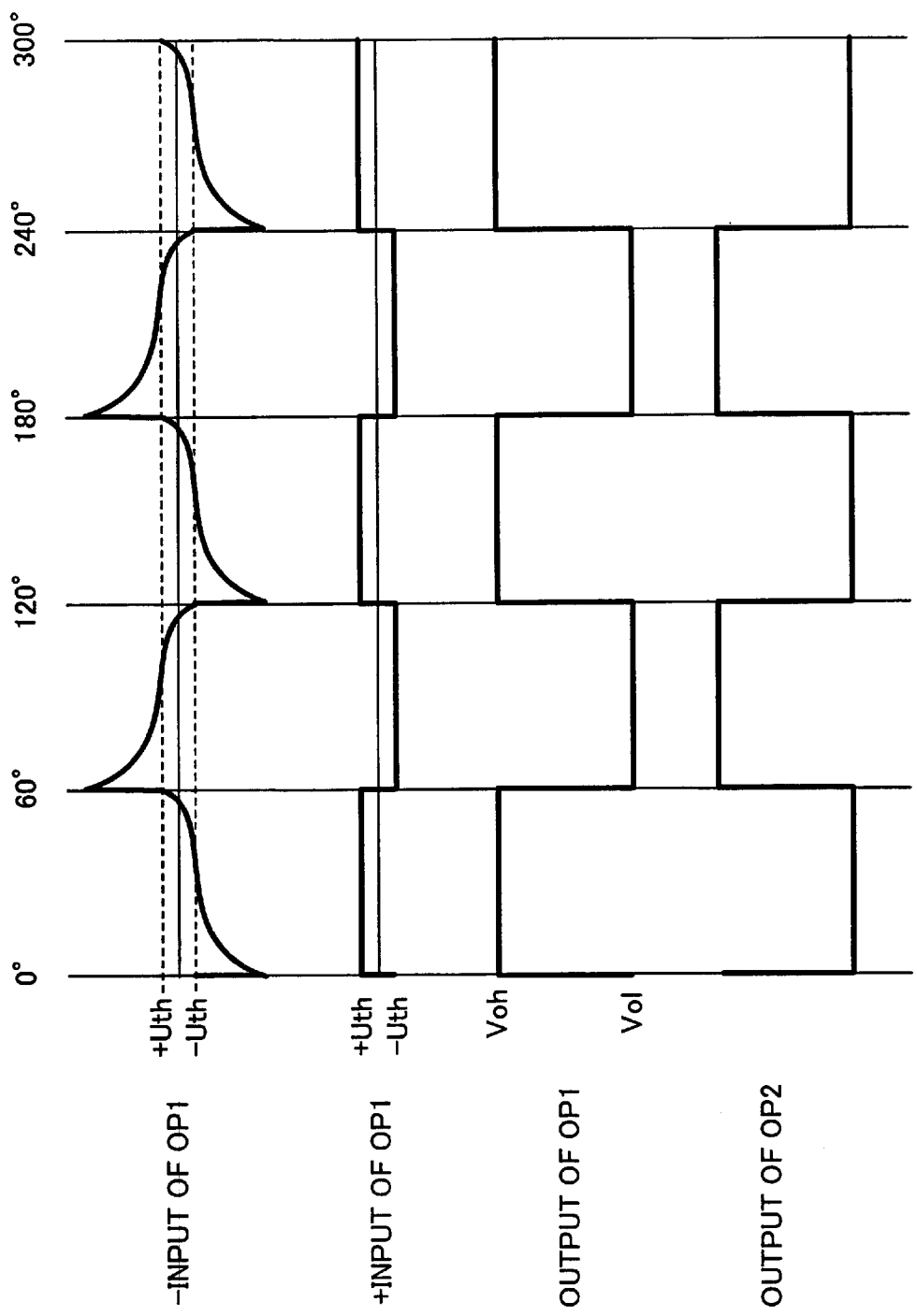
FIG. 2 is a diagram showing waveforms at essential parts of the drive circuit during rotational operation of the motor.

FIG. 2 is a diagram showing waveforms at essential parts of the drive circuit during rotational motion of the motor.

The following description is given by taking an example of a brushless motor having a rotor magnet in six-pole configuration, and hence the switching of magnetic poles occurs whenever the magnet rotor rotates through 60 degrees.

During rotational motion of the motor, the signal inputted to the non-inverting input of the first operational amplifier OP1 is voltage induced in the search coil L1, which has a waveform representative of a combination of induced voltage induced by changes in magnetic flux caused by the rotational motion of the rotor magnet and induced voltage caused by the back electromotive force of the drive coil L2.

The voltage ±Uth of the reference voltage is inputted to the inverting input of the first operational amplifier OP1 and the output from the first operational amplifier OP1 changes its output state when the induced voltage in the search coil L1 exceeds the voltages ±Uth.

The second operational amplifier OP2 having the output of the first operational amplifier OP1 connected thereto via the capacitor C1 acts as an inverter combined with a capacitor, which inverts the signal from the first operational amplifier OP1. This causes the drive coil L2, which has its opposite ends connected to the output of the first operational amplifier OP1 and that of the second operational amplifier OP2, respectively, to be supplied with a full-wave drive current in accordance with switching of magnetic poles of the rotor magnet. At this time, the output signal from the second operational amplifier OP2 is delivered via the resistance R8 from the external output terminal SG-OUT. The output signal during the rotational motion has a frequency of about 150 Hz.

Now, the description will be given of an operation of the drive circuit of the brushless motor performed when the brushless motor is stopped e.g. due to abutment of the fan with a foreign object.

Figure 3:
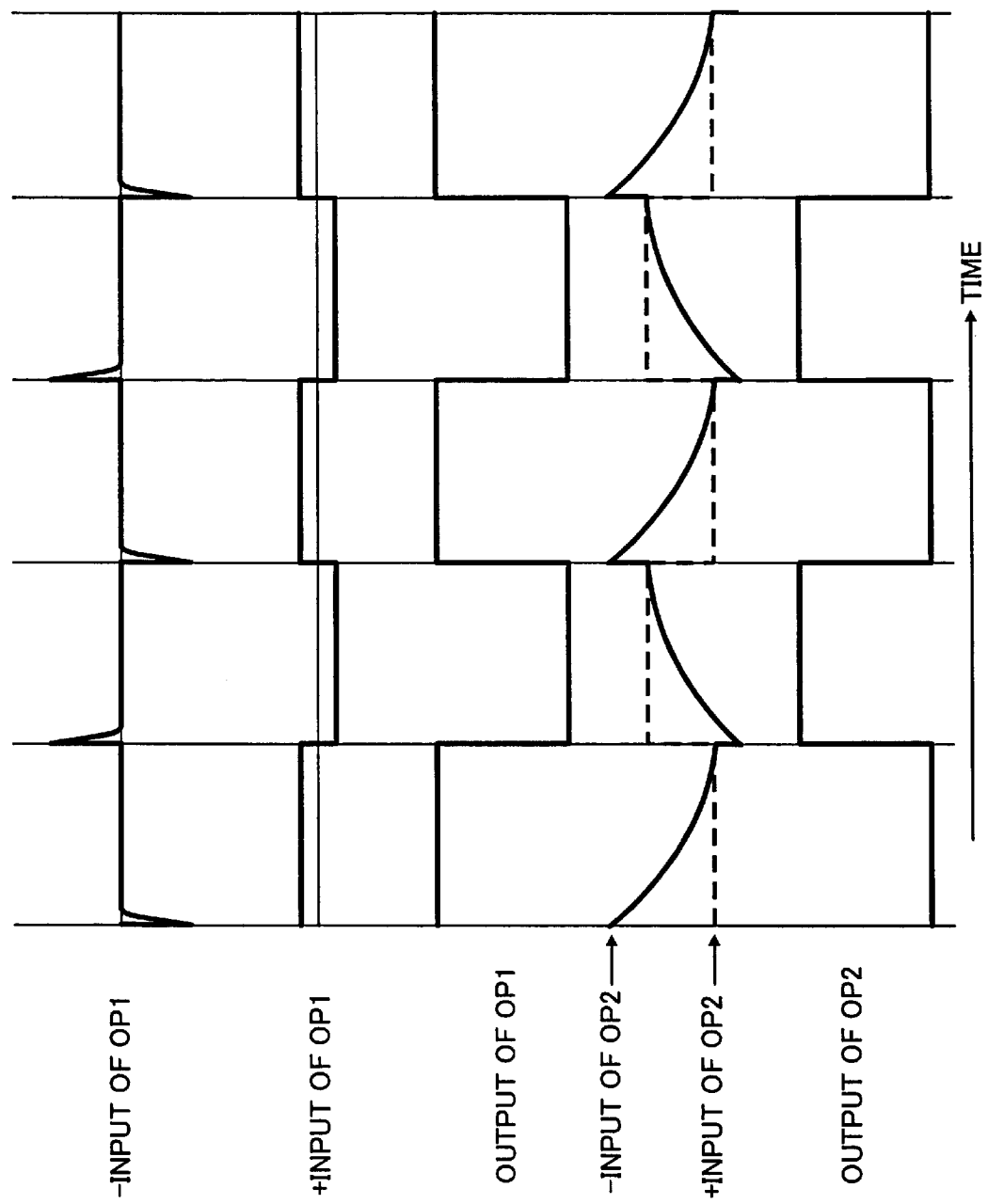
FIG. 3 is a diagram showing waveforms at essential parts of the drive circuit during stoppage of rotation of the motor.
Figure 4:
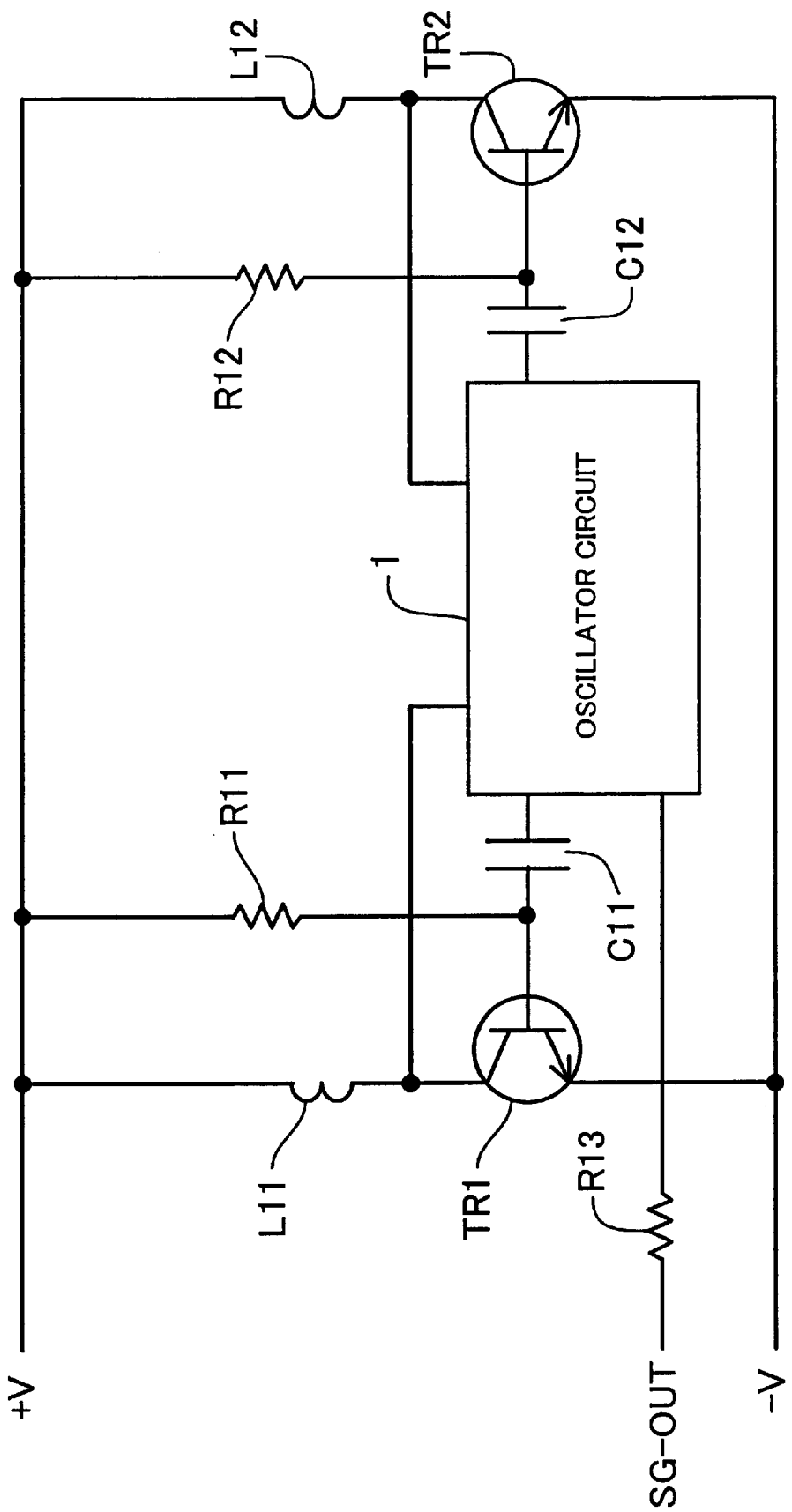
FIG. 4 is a circuit diagram showing an example of a conventional drive circuit of a brushless motor.
Figure 5:
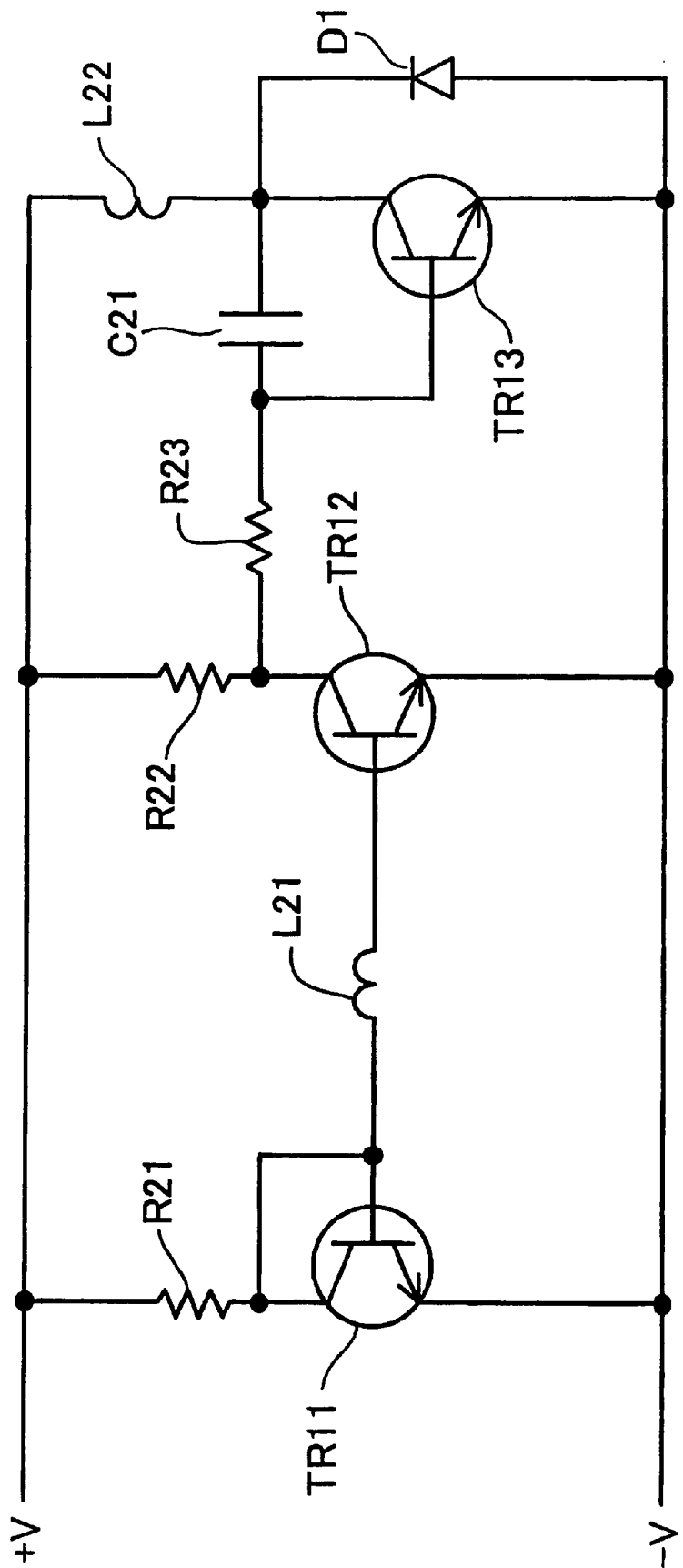
FIG. 5 is a circuit diagram showing another example of the conventional drive circuit of the brushless motor.

FIG. 3 is a diagram showing waveforms at essential parts of the drive circuit during stoppage of the motor.

When the brushless motor is stopped, the output from the first operational amplifier OP1 is fixed at a high level or low level. As a result, the charge or discharge of the capacitor C1 connected to the non-inverting input of the second operational amplifier OP2 is started, and when the potential of the capacitor increasingly or decreasing crosses the reference voltage supplied to the inverting input of the second operational amplifier OP2, the output from the second operational amplifier OP2 is inverted, thereby cutting off the drive current being supplied to the drive coil L2 or supplying the drive current to the drive coil L2. At this time, only the back electromotive force generated in the drive coil L2 is detected by the search coil L1.

The signal detected by the search coil L1 is inputted to the inverting input of the first operational amplifier OP1. The induced voltage caused by the back electromotive force of the drive coil L2 has a peak waveform, and when the peak waveform is detected, the first operational amplifier OP1 changes its output status.

This causes the output of the first operational amplifier OP1 to be fixed at a low level or high level, and the discharge or charge of the capacitor C1 connected to the non-inverting input of the second operational amplifier Op2 is started, and when the potential of the capacitor C1 decreasingly or increasing crosses the reference voltage supplied to the inverting input of the second operational amplifier OP2, the output from the second operational amplifier OP2 is inverted, thereby supplying the drive current to the drive coil L2 or cutting off the drive current being supplied to the drive coil L2.

Thus, the second operational amplifier OP2 repeatedly carries out on/off operation at the predetermined frequency determined by the capacitor C1 and the resistances R5, R6, R7. This on/off operation causes the motor to be alternately driven in normal and reverse directions, whereby the motor attempts to rotate by its own force. Therefore, since the repetition period of on/off operation is required to be set to be longer than a time period required for the rotor portion of the magnet to rotate from one pole to a next pole, i.e. for the rotor portion to rotate through 60 degrees or more, the oscillator circuit formed by the second operational amplifier OP2 is configured such that it oscillates at a predetermined frequency in a range of 5 Hz to 10 Hz. At this time, the output signal from the second operational amplifier OP2 is delivered via the resistance R8 from the external output terminal SG-OUT as an alarm signal indicative of detected stoppage of rotation of the motor.

Now, the description will be given of an operation of the drive circuit performed after the foreign object is removed to recover the motor from the locked status of the fan, or after the power is turned on to start the motor. During the stoppage of rotation of the motor, the drive current alternately flows through the drive coil L2 at a repetition period of the on/off operation of the second operational amplifier OP2, and after the recovery from the locked status, the supply of the drive current drives the motor for clockwise or counterclockwise rotational motor. When a first driving operation for rotation after the recovery from the locked status fails, then a next driving operation for rotation in an opposite direction is carried out. When the rotor portion of the magnet starts rotation and the switching of magnetic poles is carried out before a next driving operation in an opposite direction is carried out, the rotation of the rotor is accelerated by the next driving operation, and thereafter, in a manner following the description given of the operation during rotational motion of the motor, the rotational speed of the motor rises to a rotational speed which is balanced with the back electromotive force of the drive coil L2 and the braking torque by attraction of the yoke, whereby the motor is stabilized at a constant rotational speed.

As described heretofore, according to the invention, the drive circuit of the brushless motor includes a Schmitt trigger circuit formed by the first operational amplifier and an oscillator circuit formed by the second operational amplifier, with the input of the first operational amplifier receiving a rotation detection signal indicative of rotation of a rotor portion generated by a search coil, opposite ends of a drive coil being connected to the output of the first operational amplifier and the output of the second operational amplifier, whereby during rotation of the rotor, in response to the rotation detection signal, the drive coil is caused to be alternately driven by the first operational amplifier and the second operational amplifier acting as an inverter, and during stoppage of rotation of the rotor portion, the oscillator circuit formed by the second operational amplifier delivers a signal indicative of the stoppage of rotation of the rotor portion to the outside. This makes it possible to realize the brushless motor including the search coil and the drive coil by a simplified construction using two operational amplifiers, and the drive circuit has a function of detecting stoppage of rotation of the motor, by causing the second operational amplifier to function as the oscillator circuit when the rotation of the rotor portion is stopped. Moreover, since the drive circuit is constructed by using operational amplifiers, the oscillation frequency can be made very stable.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A drive circuit of a brushless motor including a drive coil for driving a rotor portion of a magnet, and a search coil for detecting rotation of the rotor, characterized by comprising:

a first operational amplifier that forms a Schmitt trigger circuit performing on/off operation based on a rotation detection signal generated by the search coil, and has an output thereof connected to one end of the drive coil; and a second operational amplifier that forms an oscillator circuit performing inversion in synchronism with the on/off operation of said first operational amplifier, and oscillating at a predetermined frequency when said first operational amplifier does not perform the on/off operation, and has an output thereof connected to another end of the drive coil and at the same time to an output terminal to an external circuit.

2. A drive circuit of a brushless motor according to claim 1, wherein said first operational amplifier has an inverting input thereof connected to one end of the search coil which has another end thereof connected to a neutral voltage point equally diving a voltage of a power supply by a first resistance and a second resistance, and a non-inverting input thereof connected to a common junction of a third resistance and a fourth resistance which are connected in series between the neutral voltage point and an output of said first operational amplifier such that a reference voltage is provided to the Schmitt trigger circuit, and wherein said second operational amplifier has an inverting input thereof connected to one end of a capacitor, the capacitor having another end connected to the output of said first operational amplifier, and to one end of a fifth resistance which has another end thereof connected to the output of said second operational amplifier and forms a time constant circuit of the oscillator circuit together with the capacitor, and a non-inverting input terminal thereof connected to a common junction of a sixth resistance and a seventh resistance which are connected in series between the neutral voltage point and an output of said second operational amplifier such that a reference voltage is provided to the oscillator circuit.

3. A drive circuit of a brushless motor according to claim 1, wherein the oscillator circuit formed by said second operational amplifier has a oscillator frequency whose repetition period is set to be longer than a time period required for the rotor portion of the magnet to perform rotational motion by driving of the drive coil by one oscillating output, at least until the rotor portion carries out switching of magnetic poles.

4. A drive circuit of a brushless motor according to claim 1, wherein the brushless motor is a fan motor for an aspirator.

* * * * *